(12) United States Patent
Lorkowski

(10) Patent No.: US 8,408,498 B2
(45) Date of Patent: Apr. 2, 2013

(54) AERODYNAMIC BODY AND HIGH-LIFT SYSTEM COMPRISING SUCH AN AERODYNAMIC BODY

(75) Inventor: Thomas Lorkowski, Taufkirchen (DE)

(73) Assignee: Airbus Operations GmbH, Hamburg (DE)

( * ) Notice: Subject to any disclaimer, the term of this patent is extended or adjusted under 35 U.S.C. 154(b) by 201 days.

(21) Appl. No.: 12/936,421

(22) PCT Filed: Apr. 7, 2009

(86) PCT No.: PCT/EP2009/002573
§ 371 (c)(1),
(2), (4) Date: Oct. 5, 2010

(87) PCT Pub. No.: WO2009/124728
PCT Pub. Date: Oct. 15, 2009

(65) Prior Publication Data
US 2011/0024574 A1 Feb. 3, 2011

Related U.S. Application Data

(60) Provisional application No. 61/042,808, filed on Apr. 7, 2008.

(30) Foreign Application Priority Data

Apr. 7, 2008 (DE) .......................... 10 2008 017 574

(51) Int. Cl.
*B64C 15/14* (2006.01)
(52) U.S. Cl. ...................................... 244/206; 244/207
(58) Field of Classification Search .......... 244/206–208, 244/213, 53 R, 53 B, 198, 200.1, 134 R
See application file for complete search history.

(56) References Cited

U.S. PATENT DOCUMENTS
(Continued)

FOREIGN PATENT DOCUMENTS

| BE | 358128 A | 2/1929 |
|---|---|---|
| CN | 1131109 A | 9/1996 |

(Continued)

OTHER PUBLICATIONS

International Search Report for corresponding PCT Application No. PCT/EP2009/002573, Oct. 20, 2009.
International Preliminary Report on Patentability and Written Opinion for corresponding PCT Application No. PCT/EP2009/002573, Nov. 30, 2010.

(Continued)

*Primary Examiner* — Timothy D Collins
*Assistant Examiner* — Nicholas McFall
(74) *Attorney, Agent, or Firm* — Matthew B. Dernier, Esq.; Gibson & Dernier LLP

(57) ABSTRACT

An aerodynamic body with an outside with a top and bottom in relation to the direction of airflow, with lateral end parts that form the lateral ends of the aerodynamic body when viewed across the direction of airflow, where in the interior of the aerodynamic body a duct with an airflow drive with a drive motor and a compressor means that is driven by the aforesaid and that is arranged in the duct is arranged, with at least one inlet at the bottom and/or at at least one of the lateral end parts of the aerodynamic body and with at least one outlet at the top of the aerodynamic body for influencing the airflow at the aerodynamic body is arranged, where in the duct a sleeve is arranged which is rotatable by means of a drive motor, which sleeve includes at least one recess which at a particular rotational position of the sleeve can be made to at least in part coincide with the outlet at the top of the aerodynamic body so that the air that has been compressed by the compressor flows through the recess in the sleeve and through the outlet, as well as a high-lift system comprising such an aerodynamic body.

23 Claims, 2 Drawing Sheets

U.S. PATENT DOCUMENTS

| | | | | |
|---|---|---|---|---|
| 2,896,881 A | * | 7/1959 | Attinello | 244/207 |
| 3,005,496 A | | 10/1961 | Nichols | |
| 3,692,259 A | | 9/1972 | Yuan | |
| 3,854,678 A | * | 12/1974 | Geres | 244/3.16 |
| 5,366,177 A | | 11/1994 | DeCoux | |
| 5,772,156 A | | 6/1998 | Parikh et al. | |
| 6,135,395 A | | 10/2000 | Collett | |
| 6,390,116 B1 | | 5/2002 | Rohwer et al. | |

FOREIGN PATENT DOCUMENTS

| | | |
|---|---|---|
| CN | 1243485 A | 2/2000 |
| EP | 0776821 A1 | 6/1997 |

OTHER PUBLICATIONS

Ralph Petz, et al. : Designing Actuators for active separation control experiments on high lift configurations Notes on Numerical Fluid Mechanic and Multidisciplinary Design., Bd. 95, p. 69-84, Jan. 1, 2007.

J. D. McLean et al., NASA Study "Study of the Application of Separation Control by Unsteady Excitation to Civil Transport Aircraft", pp. 1-59, Jun. 1999.

Office Action for corresponding Chinese Patent Application No. 200980112303.X, dated Sep. 25, 2012.

\* cited by examiner

AERODYNAMIC BODY AND HIGH-LIFT SYSTEM COMPRISING SUCH AN AERODYNAMIC BODY

CROSS REFERENCE TO RELATED APPLICATIONS

This application claims priority to PCT Application No. PCT/EP2009/002573, filed Apr. 7, 2009; which claims priority to German Patent Application No. DE 10 2008 017 574.9, filed Apr. 7, 2008, and claims the benefit to U.S. Provisional Patent Application No. 61/042,808, filed Apr. 7, 2008, the entire disclosures of which applications are hereby incorporated by reference.

BACKGROUND

The invention relates to an aerodynamic body and to a high-lift system comprising such an aerodynamic body.

U.S. Pat. No. 3,005,496 describes a helicopter rotor blade adjustably mounted for pitch angle control comprising a compressed air duct in which a valve closure member is rotatably disposed. At the blade tip a series of passages which can be opened and closed by the valve closure member, which open as ports from the hollow blade spar and which lead to a slot near the trailing edge of the blade. With this arrangement, any changes in the rotor blade pitch angles during the rotation thereof, will produce relative pivotal movement between the blade and the vane arm and hence, a turning of the jet ports relative to the valve closure member.

Airfoils with an inner channel which opens as ports are also disclosed in U.S. Pat. No. 3,692,259 and U.S. Pat. No. 6,390,116 B1.

U.S. Pat. No. 5,772,156 A describes the removal by suction of air through an inlet at the top of a wing, and to the blowing out through an outlet at the bottom of the wing, which outlet is connected to the inlet by way of a duct. A compressor is used to drive the airflow.

From U.S. Pat. No. 5,366,177 A removal by suction of air from a perforated exterior skin area at the top of a lift flap for influencing the boundary layer is known. Furthermore, according to this document a suction generating device comprising a pump, a turbo compressor or an electrically or hydraulically operated vacuum system is provided.

In the NASA study "Study of the Application of Separation Control by Unsteady Excitation to Civil Transport Aircraft" by J. D. McLean et al. of June 1999 and in the study "Designing Actuators for Active Separation Control Experiments on High-Lift Configurations" by Ralf Petz and Wofgang Nitsche, Berling University of Technology the option of pulsed blowing-out of air on the outside of a wing is described.

SUMMARY OF THE INVENTION

It is the object of the invention to create an aerodynamic body and a high-lift system comprising such an aerodynamic body, by means of which aerodynamic body and high-lift system influencing the airflow is possible in an efficient manner, wherein said aerodynamic body and the high-lift system can be equipped so as to be safe in operation and flexible in relation to changing flow conditions.

This object is met by the characteristics of the one or more embodiments disclosed and described herein. Further exemplary embodiments are also disclosed and described herein.

With the solution according to the invention, pulsed blowing-out of air takes place at the top of the aerodynamic body which generally-speaking can refer to the wing of an aircraft, a rudder or a flap, a high-lift body or high-lift flap or some other aerodynamic body.

According to the invention, an aerodynamic body is provided with an exterior skin with a top and bottom in relation to the direction of airflow and with lateral end parts that form the lateral ends of the aerodynamic body when viewed across the assumed direction of airflow. In the interior of the aerodynamic body a duct with an airflow drive with a drive motor and a compressor means that is driven by the aforesaid and that is arranged in the duct is arranged. For the purpose of influencing the airflow on the aerodynamic body, said aerodynamic body at its bottom and/or at at least one of its lateral end parts comprises at least one inlet and at the top at least one outlet. According to the invention, in the duct a sleeve is arranged which is rotatable by means of a drive motor. The sleeve comprises at least one recess which at a particular rotational position of the sleeve can be made to at least in part coincide with the outlet at the top of the aerodynamic body so that the air that has been compressed by the compressor flows through the recess in the sleeve and through the outlet.

Pulsed blowing-out of the air is achieved in that the recess of the sleeve is made to coincide only at times with the outlet of the aerodynamic body.

With the use of the airflow drive, by means of which the air in the sleeve is driven, it is possible to achieve relatively large throughputs of air mass that are required for blowing out at the top of the aerodynamic body in order to achieve effective influencing of the airflow. Since the compressed air is generated by means of the airflow drive near the blowing-out position, the necessary pressure level is considerably reduced. This measure, furthermore, makes it possible to do without expensive pipe arrangements to supply compressed air, for example from the engine bleed air, and to merely provide electrical lines for supplying energy to the airflow drive and/or to the drive device for the sleeve, and consequently the required installation space can be minimized.

If the inlets are arranged on one lateral end part or on both lateral end parts, any end edge vortices, which could be a source of noise, can be reduced by removal of the air by suction.

According to the invention, furthermore, a high-lift system with an aerodynamic body according to one of the embodiments according to the invention is provided. The high-lift system comprises a control device by means of which the drive device of the sleeve is functionally coupled, and which comprises a control function for forming positioning signals or positioning commands for setting a rotational position of the sleeve in the duct and/or for setting the speed of rotation of the sleeve.

In this context the direction of airflow is considered to be the direction of airflow assumed for the aerodynamic body, i.e. the direction from which air flows around the aerodynamic body affixed to the aircraft. In this arrangement, in particular, a neutral position or middle position of the aircraft and/or of the flow flap is assumed.

BRIEF DESCRIPTION OF THE DRAWINGS

Below, exemplary embodiments of the invention are described with reference to the enclosed figures which show the following.

DETAILED DESCRIPTION OF THE INVENTION

Figure 1:
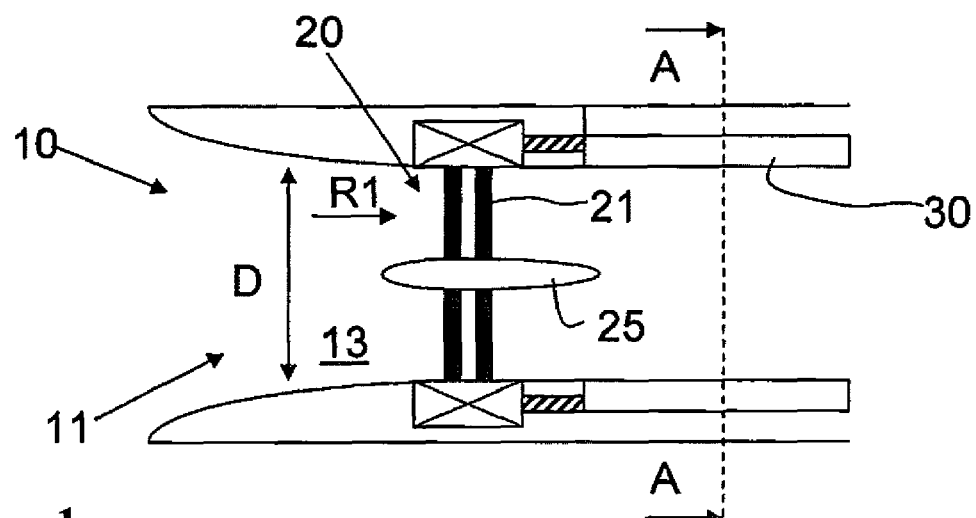
FIG. 1 illustrates a cross section, when viewed in the direction of wing depth, of the input region of an embodiment of the air duct according to the invention with a compressor.
Figure 2:
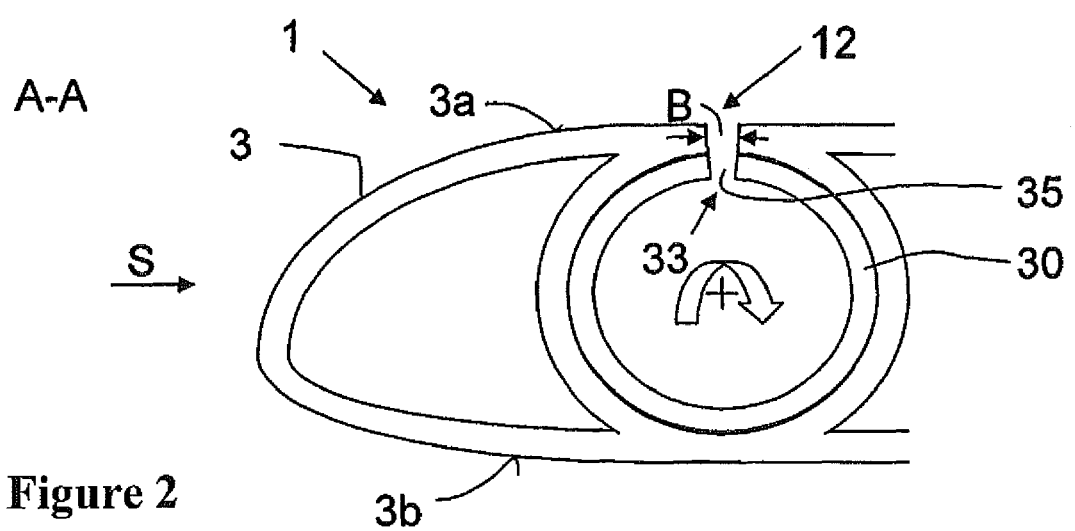
FIG. 2 illustrates a cross section of the embodiment of the air duct according to FIG. 1 when viewed in wingspan direction.

FIG. 1 shows part of the duct or air duct 10 that is arranged in the interior of the aerodynamic body 1. In particular, FIG. 1 shows the input region 11a of the duct 10. The input region leads to the outside 3 of the aerodynamic body 1 so that the input region 11a forms the inlet 11 at the outside 3 of the aerodynamic body 1.

The aerodynamic body 1 generally comprises an outside 3 with a top 3a and a bottom 3b whose orientations result from an assumed direction of airflow S. The top 3a can, in particular, be the top when viewed from the point of view of aerodynamics. Furthermore, the aerodynamic body 1 comprises lateral end parts 5a, 5b which form the lateral ends, when viewed across the assumed direction of airflow S, of the aerodynamic body 1.

Figure 3:
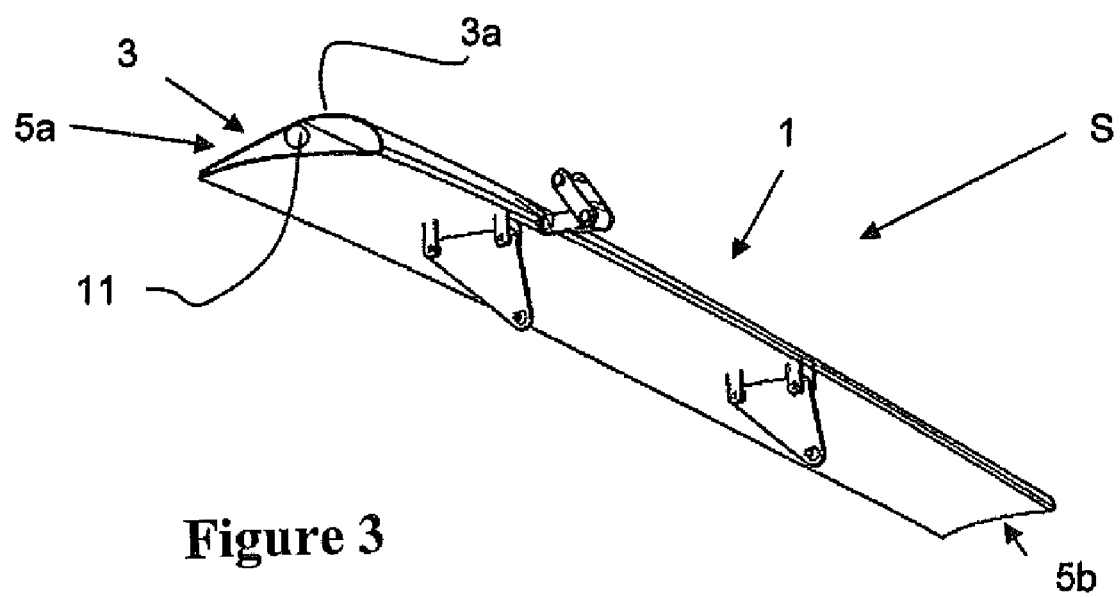
FIG. 3 illustrates a high-lift flap as an exemplary embodiment of the aerodynamic body according to the invention, with the inlet of an air duct at a lateral section of the aerodynamic body.

In the exemplary embodiment shown in FIG. 3, the inlet 11 of the duct 10 is arranged at the lateral end parts 5a, 5b which form the lateral ends, when viewed across the assumed direction of airflow S, of the aerodynamic body 1. The duct 10 can also comprise two inlets 10, wherein one inlet 10 is formed on a first end section 5a, and a second inlet 11 is formed on a second end section 5b. As an alternative or in addition, an inlet 11 of the duct 10 can also be arranged at the bottom 3b of the aerodynamic body 1. The duct 10 can thus comprise one or several inlets 11 that are situated at the bottom 3b and/or at at least one of the lateral end parts 5a, 5b of the aerodynamic body 1.

In the duct 10 a sleeve 30 is rotatably held, which sleeve 30 is coupled to a drive motor so that the sleeve 30 can be rotated by the drive motor. The sleeve 30 comprises a recess 33 whose position correlates to the position of the outlet 12 at the top 3a of the aerodynamic body 1 in such a manner that in a particular rotational position of the sleeve 30 the recess 33 of said sleeve can be made to partly or entirely coincide with the outlet 12 at the top 3a of the aerodynamic body 1. In a corresponding rotational position of the sleeve 30, in which the recess 33 and the outlet 12 are partly situated one on top of the other, the air driven by the airflow drive in the duct 10 thus escapes through the outlet 12.

In one embodiment of the invention the duct 10 at least in some sections extends in the span direction of the aerodynamic body 1 or obliquely in relation to the aforesaid.

The recess 33 of the rotatable sleeve 30 can be designed in various ways and can, in particular, be designed in the form of a slit that extends in axial direction of the sleeve 30. Furthermore, the outlet 12, too, can be designed in various ways and can, in particular, be designed in the form of a slit that extends in the span direction of the aerodynamic body 1. In this arrangement, in particular, the longitudinal direction of the slit-shaped recess 33 and the longitudinal direction of a slit-shaped outlet can extend parallel or at an acute angle to each other.

The outlet 12 and the recess 33 can comprise several apertures that are arranged one behind the other along the span direction of the aerodynamic body 1. The outlet of the duct 10 can be formed by several slits at the top 3a of the aerodynamic body 1, with the longitudinal directions of said slits extending across the direction of airflow S, and with said slits being arranged one behind the other when viewed in their longitudinal direction. As an alternative or in addition, the outlet of the duct 10 can be formed by several slits at the top 3a of the aerodynamic body 1 of an aircraft, with the longitudinal directions of said slits extending across the direction of airflow, and with said slits being arranged one behind the other when viewed in the direction of airflow S.

The width 35 of the sleeve 30, which width extends in circumferential direction of the sleeve 30, can be wider or narrower than the width of the outlet at the top 3a of the aerodynamic body 1 of an aircraft, which width extends in the direction of airflow S. In particular it can be provided for the width 35 of the sleeve 30, which width extends in circumferential direction of said sleeve, to measure at least 75% of the width of the outlet at the top 3a of the aerodynamic body 1 of an aircraft, which width extends in the direction of airflow S.

The length of the outlet at the top 3a of the aerodynamic body 1 can measure more than 40% of the span of the aerodynamic body 1.

The sleeve can comprise several recesses 33 which in circumferential direction of the sleeve 30 are arranged so as to be distributed over the circumference of the sleeve 30.

At the outlet 12 it is also possible for a flow-through adjustment device to be arranged, which flow-through adjustment device can change the size of the outlet in order to influence the air throughput that occurs at the outlet 12 if the positions of the recess 33 and of the outlet 12 coincide. As an alternative or in addition, a flow-through adjustment device can be arranged on the recess 33, which flow-through adjustment device can change the size of the recess 33 in order to influence the air throughput occurring at the recess 33.

In a further embodiment of the invention one or both of the above-mentioned flow-through adjustment devices, to the extent that they are provided, can comprise an aperture part that is arranged on the outlet 12 or on the recess 33 and that is pre-tensioned to the closed position of the inlet, which aperture part is set in such a manner that the aperture part at a predetermined first pressure occurring at the outlet 12 or at the recess 33 moves to an open position, while at a predetermined second pressure occurring at the outlet 12 or the recess 33 moves to the closed position. The flow-through adjustment device can be actively controlled.

The airflow drive or the compressor can be an axial compressor 20, and the compressor means can comprise impeller blades 21 whose rotary axis extends in longitudinal direction R1 of the duct 10. The drive motor can be installed in a container 25 that is held in the duct 10 by means of supporting parts. The drive motor can be an external-rotor type motor. As an alternative, the compressor can be a radial compressor 20, and the compressor means can be a compressor impeller. The rotary axis of the radial compressor can extend in longitudinal direction R1 of the duct 10. As an alternative, the rotary axis of the radial compressor can extend at an angle to the longitudinal direction R1 of the duct 10.

The sleeve can be rotationally coupled to the compressor means. In this case the drive motor of the compressor means is the drive motor of the sleeve.

As an alternative the sleeve is rotationally coupled to the compressor means so that the speed of rotation of the sleeve 30 depends on the speed of rotation of the compressor means. In this arrangement the sleeve can be rotationally coupled to the compressor means in such a way that the sleeve 30 rotates at the same speed of rotation as does the compressor means.

As an alternative the sleeve can be rotationally coupled to the compressor means by way of a transmission arrangement so that the speed of rotation of the sleeve depends on the speed of rotation of the compressor means. In this arrangement the transmission ratio of the transmission arrangement can be fixed or adjustable.

In a further exemplary embodiment of the invention, at the recess 33 of the sleeve 30 a flow-through adjustment device can be arranged that can change the size of the recess 33 of the sleeve 30 in order to influence the air throughput that occurs at the recess 33.

In a further exemplary embodiment of the invention a high-lift system of an aircraft with an aerodynamic body 1 according to one of the described exemplary embodiments is provided. The high-lift system comprises a control device by means of which the drive device of the sleeve and/or of the compressor means is functionally coupled, and which control device comprises a control function to form positioning signals or positioning commands for setting a rotational position of the sleeve in the duct and/or for setting the speed of rotation of the sleeve or for setting a rotational position of the sleeve in the duct and/or for setting the speed of rotation of the compressor means. In this arrangement the control device can, in particular, be an input device for receiving sensor data and/or system data, and the control function can be equipped in such a manner that it determines positioning commands for setting a rotational position of the sleeve 30 in the duct 10 and/or of the speed of rotation of the sleeve 30 and/or for setting the speed of rotation of the compressor means depending on the adjustment state of the aerodynamic body 1 of an aircraft.

In a further exemplary embodiment the control device can comprise an input device by means of which the control device can receive sensor data and/or system data. In this arrangement the control function can be designed in such a manner that it determines the positioning commands for setting a rotational position of the sleeve 30 in the duct 10 and/or the speed of rotation of the sleeve 30 depending on the sensor data and/or system data.

The control device can be integrated in the aerodynamic body 1.

The input device of the control device can be equipped in such a manner and, in particular, can comprise a function by means of which data can be received by the flight control system of the aircraft. The data can be air data such as the static and/or dynamic pressure and/or system data. In this arrangement operating functions that in particular characterize the flight phase, e.g. takeoff or landing, can be used as system data. The control function can be designed in such a manner that it determines positioning commands for setting a rotational position of the sleeve 30 in the duct 10 and/or the speed of rotation of the sleeve 30 depending on the data of a flight control system.

As an alternative or in addition, the input device of the control device can be designed in such a manner and can, in particular, comprise a function by means of which, for example, data such as air data, in other words e.g. the static and/or dynamic pressure, and/or system data, in particular for designating operational functions such as flight phases can be received by a flight control system, and the control function can be designed in such a manner that it determines positioning commands for setting the speed of rotation of the compressor means or the output of the compressor means depending on the above-mentioned data, e.g. of the flight control system. Consequently, corresponding control of the speed of rotation or of the compressor output can be carried out in order to achieve a state-dependent air mass throughput.

In this arrangement the data received by the flight control system of the aircraft can relate to the rotational position of the sleeve 30 in the duct 10 and/or the speed of rotation of the sleeve 30, and the control function can be such that it determines positioning commands relating to the rotational position of the sleeve 30 in the duct 10 and/or the speed of rotation of the sleeve 30 depending on the adjustment position of the aerodynamic body 1 of an aircraft. During transmission of a rotational position to the control function and thus also to the drive device of the sleeve 30 the aforesaid is set to a desired position. This desired position can be a position in which the recess 33 or one of the recesses of the sleeve is made to entirely or partly coincide with the outlet 12 or with several outlets 12 of the duct 10. In this state there is thus no pulsed outflow of compressed air.

In another exemplary embodiment the control function can be such that it determines the positioning commands relating to the rotational position of the sleeve 30 in the duct 10 and/or the speed of rotation of the sleeve 30 depending on air data that has been transmitted by the flight control system.

In these exemplary embodiments the angle of attack of the aircraft and/or the speed and/or the flight attitude of the aircraft can be used as air data.

In a further exemplary embodiment it can be provided for the control device for commanding the rotational position of the sleeve 30 in the duct 10 and/or the speed of rotation of the sleeve 30 to comprise a comparison function that compares transmitted air data and/or the adjustment position of the aerodynamic body 1 of an aircraft with a first desired value and with a second desired value, wherein when the first desired value is attained in some regions the control function generates control commands for activating the drive of the sleeve 30, and when the second desired value is attained in some regions the control function generates control commands for stopping the drive of the sleeve 30 and transmits the aforesaid to the flow-through adjustment device.

The control device with the above-mentioned functions can be equipped and can be coupled both to a drive device for driving the compressor means and to a drive device for driving the sleeve in such a manner that both the compressor means and the sleeve are controlled and made to rotate. In this arrangement the control commands relating to the sleeve and relating to the compressor means can in each case be determined separately according to one of the above-mentioned control functions, and input variables provided for these can be determined.

Furthermore, the control commands relating to the compressor means and to the sleeve can be functionally coupled so that the speed of rotation of the sleeve at least in a period of time equals the speed of rotation of the compressor means, the speed of rotation of the sleeve at least in a period of time is a fraction or a multiple of the speed of rotation of the compressor means, or the speed of rotation of the sleeve at least in a period of time by way of a predetermined functional correlation is coupled to the speed of rotation of the compressor means.

The control device can be integrated with a computer situated in the fuselage of the flight control system, and the positioning commands can be transmitted to the flow-through adjustment device by way of a command line.

In the above-mentioned exemplary embodiments the aerodynamic body 1 can comprise at least one sensor and optionally in addition a sensor function, for example a pressure sensor that is arranged on the aerodynamic body 1 for the purpose of measuring the static pressure of the airflow, and that is functionally connected to the input device for the purpose of transmitting the measured pressure to the control function. In this arrangement the control function is designed in such a manner that it determines positioning commands depending on the measured pressure. The pressure sensor can be arranged on the inlet 11 and/or on the outlet 12 of the duct 10. The sensor can also be arranged on the outside 3a so as to detect the quality of the airflow and in particular any separation of the airflow from the aerodynamic body. The sensor, and optionally in addition a sensor function, can be designed in such a manner that with them a pressure, a wall shear stress and/or a flow speed can be determined.

In this embodiment it can additionally be provided for the control device to comprise a comparison function by means of which the pressures on the at least one inlet and on the at least one outlet are compared, and for the positioning commands to be determined depending on the pressure differential determined.

The control device in the described variants can be integrated in a central computer of the high-lift system that commands the adjustment of the high-lift flaps.

In a further exemplary embodiment the control device can comprise a table with an allocation of predetermined operational data and desired adjustment positions of the flow-through adjustment device as well as a comparison function by means of which measured operational data is compared to the operational data stored in the comparison table, and if there is agreement of said data in some regions the respectively allocated desired adjustment position can be transmitted to the inlet adjustment device.

The invention claimed is:

1. An aerodynamic body for at least one of an airfoil, a leading-edge device and a trailing-edge device of an aircraft, comprising:
   an outside having a top and bottom in relation to a direction of airflow,
   lateral end parts that form lateral ends of the aerodynamic body when viewed across the direction of airflow,
   arranged in an interior of the aerodynamic body, the duct including an airflow drive with a first drive motor and a compressor means that is driven by the aforesaid, and the duct having at least one inlet at one or more of: (i) the bottom, and (ii) at least one of the lateral end parts of the aerodynamic body, and having at least one outlet at the top of the aerodynamic body for influencing the airflow at the aerodynamic body,
   wherein a sleeve arranged within the duct which is rotatable by means of a second drive motor, which sleeve comprises at least one recess which at a particular rotational position of the sleeve is made to at least in part coincide with the at least one outlet at the top of the aerodynamic body so that the air that has been compressed by the compressor flows through the recess in the sleeve and through the outlet, and
   a flow-through adjustment device arranged at the outlet which can change a size of the outlet in order to influence the air throughput that occurs at the outlet.

2. The aerodynamic body of an aircraft according to claim 1, wherein at least one of:
   the recess of the rotatable sleeve has the form of a slit that extends in an axial direction of the sleeve, and
   the sleeve comprises several recesses, which in circumferential direction of the sleeve, are arranged so as to be distributed over a circumference of the sleeve.

3. The aerodynamic body of an aircraft according to claim 1, wherein the outlet has the form of a slit that extends in span direction of the aerodynamic body.

4. The aerodynamic body of an aircraft according to claim 1, wherein the outlet comprises several apertures that are arranged one behind the other along the span direction of the aerodynamic body.

5. The aerodynamic body of an aircraft according to claim 4, wherein the outlet of the duct is formed by several slits at the top of the aerodynamic body with the longitudinal directions of said slits extending across the direction of airflow, and with said slits being arranged one behind the other when viewed in their longitudinal direction.

6. The aerodynamic body of an aircraft according to claim 4, wherein the outlet of the duct is formed by several slits at the top of the aerodynamic body of an aircraft, with the longitudinal directions of said slits extending across the direction of airflow, and with said slits being arranged one behind the other when viewed in the direction of airflow.

7. The aerodynamic body of an aircraft according to claim 1, wherein a width of the sleeve, which width extends in a circumferential direction of said sleeve, measures at least 75% of a width of the outlet at the top of the aerodynamic body of an aircraft, which width extends in the direction of airflow.

8. The aerodynamic body of an aircraft according to claim 1, wherein the flow-through adjustment device comprises an aperture part that is arranged on the outlet and that is pre-tensioned to the closed position of the inlet, which aperture part is set in such a manner that the aperture part at a predetermined first pressure occurring at the outlet moves to an open position, while at a predetermined second pressure occurring at the outlet moves to the closed position.

9. The aerodynamic body of an aircraft according to claim 1, wherein at the recess a further flow-through adjustment device is arranged that changes a size of the recess in order to influence the air throughput that occurs at the recess.

10. The aerodynamic body of an aircraft according to claim 9, wherein the further flow-through adjustment device comprises an aperture part that is arranged on the recess and that is pre-tensioned to the closed position of the inlet, which aperture part is set in such a manner that the aperture part at a predetermined first pressure occurring at the recess moves to an open position, while at a predetermined second pressure occurring at the recess moves to the closed position.

11. The aerodynamic body of an aircraft according to claim 1, wherein the flow-through adjustment device is actively controlled.

12. The aerodynamic body of an aircraft according to claim 1, wherein the airflow drive is an axial compressor and the compressor means comprises impeller blades whose rotary axis extends in longitudinal direction of the duct.

13. The aerodynamic body of an aircraft according to claim 1, wherein the compressor is a radial compressor and the compressor means comprises a compressor impeller.

14. The aerodynamic body of an aircraft according to claim 1, wherein the sleeve is rotationally coupled to the compressor means so that the first drive motor of the compressor means is the second drive motor of the sleeve.

15. A high-lift system of an aircraft comprising:
   an aerodynamic body, comprising:
     an outside having a top and bottom in relation to a direction of airflow,
     lateral end parts that form lateral ends of the aerodynamic body when viewed across the direction of airflow,
     a duct arranged in an interior of the aerodynamic body, the duct including an airflow drive with a first drive motor and a compressor means that is driven by the aforesaid, and the duct having at least one inlet at one or more of: (i) the bottom, and (ii) at least one of the lateral end parts of the aerodynamic body, and having at least one outlet at the top of the aerodynamic body for influencing the airflow at the aerodynamic body, a sleeve arranged within the duct which is rotatable by means of a second drive motor, which sleeve comprises at least one recess which at a particular rotational position of the sleeve is made to at least in part coincide with the at least one outlet at the top of the aerodynamic body so that the air that has been compressed by the compressor flows through the recess in the sleeve and through the outlet, and a flow-through adjustment device arranged at the outlet which can change a size of the outlet in order to influence the air throughput that occurs at the outlet, and a control device by means of which the drive device of at least one of the sleeve and the compressor means is functionally coupled, and which control device comprises a control function to form positioning signals or positioning commands for setting at least one of: a rotational position of the sleeve in the duct, the speed of rotation of the sleeve, a rotational position of the compressor means, and the speed of rotation of the compressor means.

16. The high-lift system according to claim 15, wherein the control device is an input device for receiving at least one of: sensor data and system data, and the control function determines the positioning commands for setting at least one of: a rotational position of the sleeve in the duct, and the speed of rotation of the sleeve, depending on the adjustment state of the aerodynamic body of an aircraft.

17. The high-lift system according to claim 15, wherein:
the control device comprises an input device by means of which the control device can receive at least one of: sensor data and system data, and
the control function determines the positioning commands for setting at least one of: a rotational position of the sleeve in the duct, and the speed of rotation of the sleeve, depending on the at least one of: sensor data and system data.

18. The high-lift system according to claim 15, wherein:
the input device of the control device is equipped to receive data from the flight control system of the aircraft, and
the control function determines the positioning commands for setting at least one of: a rotational position of the sleeve in the duct, and the speed of rotation of the sleeve, depending on the data of a flight control system.

19. The high-lift system according to claim 18, wherein:
the data received by the flight control system of the aircraft comprises at least one of:

the rotational position of the sleeve in the duct and the speed of rotation of the sleeve, and
the control function determines the positioning commands relating to at least one of: the rotational position of the sleeve in the duct and the speed of rotation of the sleeve depending on the adjustment position of the aerodynamic body of an aircraft.

20. The high-lift system according to claim 18, wherein the control function determines the positioning commands relating to at least one of: the rotational position of the sleeve in the duct and the speed of rotation of the sleeve, depending on air data that has been transmitted by the flight control system and depending on at least one of: an angle of attack of the aircraft, a speed, and a flight attitude of the aircraft.

21. The high-lift system according to claim 15, wherein:
the control device for commanding at least one of: the rotational position of the sleeve in the duct and the speed of rotation of the sleeve comprises a comparison function that compares at least one of: transmitted air data and the adjustment position of the aerodynamic body of an aircraft with a first desired value and with a second desired value,
when the first desired value is attained in some regions the control function generates control commands for activating the drive of the sleeve, and
when the second desired value is attained in some regions the control function generates control commands for stopping the drive of the sleeve and transmits the aforesaid to the flow-through adjustment device.

22. The high-lift system according to claim 15, wherein the aerodynamic body comprises at least one pressure sensor that is arranged on the aerodynamic body for the purpose of measuring the static pressure of the airflow, and that is functionally connected to the input device for the purpose of transmitting the measured pressure to the control function, and
the control function is designed in such a manner that it determines positioning commands depending on the measured pressure.

23. The high-lift system according to claim 22, wherein:
the control device comprises a comparison function by means of which the pressures on the at least one inlet and on the at least one outlet are compared, and
the positioning commands are determined depending on the pressure differential determined.

* * * * *